United States Patent
Darrah

(10) Patent No.: US 10,189,297 B2
(45) Date of Patent: Jan. 29, 2019

(54) WALL APPLIQUÉ

(71) Applicant: Kaysi Darrah, Cartersville, GA (US)

(72) Inventor: Kaysi Darrah, Cartersville, GA (US)

( * ) Notice: Subject to any disclaimer, the term of this patent is extended or adjusted under 35 U.S.C. 154(b) by 229 days.

(21) Appl. No.: 14/265,167

(22) Filed: Apr. 29, 2014

(65) Prior Publication Data

US 2015/0306904 A1 Oct. 29, 2015

Related U.S. Application Data

(60) Provisional application No. 61/985,027, filed on Apr. 28, 2014.

(51) Int. Cl.
| | |
|---|---|
| *B44C 5/04* | (2006.01) |
| *B44C 1/18* | (2006.01) |
| *B44C 1/10* | (2006.01) |
| *B32B 7/06* | (2006.01) |
| *B32B 7/12* | (2006.01) |
| *B32B 27/40* | (2006.01) |
| *G09F 7/12* | (2006.01) |
| *G09F 3/10* | (2006.01) |

(52) U.S. Cl.
CPC ............... *B44C 1/18* (2013.01); *B32B 7/06* (2013.01); *B32B 7/12* (2013.01); *B32B 27/40* (2013.01); *B44C 1/105* (2013.01); *B32B 2307/536* (2013.01); *B32B 2307/748* (2013.01); *B32B 2451/00* (2013.01); *B44C 5/0461* (2013.01); *G09F 3/10* (2013.01); *G09F 7/12* (2013.01); *G09F 2007/127* (2013.01)

(58) Field of Classification Search
CPC ......... B44C 5/04; B44C 5/0461; B44C 1/105; B44C 1/18; G09F 7/12; G09F 3/10; G09F 2007/127; B32B 37/12; B32B 37/18
See application file for complete search history.

(56) References Cited

U.S. PATENT DOCUMENTS

| | | | |
|---|---|---|---|
| 3,540,977 A * | 11/1970 | Schickedanz | B29C 44/32 428/318.6 |
| 4,610,899 A * | 9/1986 | Miller | D04D 7/10 156/222 |

(Continued)

*Primary Examiner* — Donald J Loney
(74) *Attorney, Agent, or Firm* — Incorporating Innovation LLC; Charlena Thorpe, Esq.

(57) ABSTRACT

Implementations of a wall appliqué are provided. In some implementations, a wall appliqué may be used to decorate and/or accent a wall or other suitable surface of a building. In some implementations, a wall appliqué may be used in lieu of traditional shoe moulding, panel moulding, ceiling moulding, door moulding, stair brackets, chair rails, and/or window moulding. In some implementations, the wall appliqué may be applied to a wall or other suitable surface with an adhesive. In some implementations, the wall appliqué comprises a body portion having a front side and a back side. In some implementations, the body portion may have a decorative shape. In some implementations, the front side may have a three-dimensional relief thereon. In some implementations, the wall appliqué may be manufactured from a flexible, polyurethane material. In this way, the wall appliqué may be applied to both flat and irregular surfaces.

18 Claims, 6 Drawing Sheets

(56) References Cited

U.S. PATENT DOCUMENTS

| | | | | |
|---|---|---|---|---|
| 5,196,246 | A * | 3/1993 | Kauss | B44C 5/0446 428/187 |
| 5,411,783 | A * | 5/1995 | Mahn, Jr. | B32B 25/00 156/234 |
| 5,874,133 | A * | 2/1999 | Cochran | B29C 43/003 427/196 |
| 6,627,284 | B1 * | 9/2003 | Naidj | B32B 5/18 40/594 |
| 6,910,307 | B1 * | 6/2005 | Maurer | E04F 19/0436 52/287.1 |
| 7,622,175 | B2 * | 11/2009 | Pallotta | B32B 7/06 428/343 |
| 7,635,416 | B1 * | 12/2009 | Hansen | B44C 5/00 156/293 |
| 2007/0000195 | A1 * | 1/2007 | Garces | B44C 5/00 52/204.61 |
| 2007/0000196 | A1 * | 1/2007 | Depaul | B44C 5/0453 52/287.1 |
| 2009/0130355 | A1 * | 5/2009 | Chen | B32B 27/32 428/36.6 |
| 2009/0158601 | A1 * | 6/2009 | Davis | B43L 13/007 33/27.12 |
| 2010/0330320 | A1 * | 12/2010 | Louis | B44C 5/00 428/41.8 |

* cited by examiner

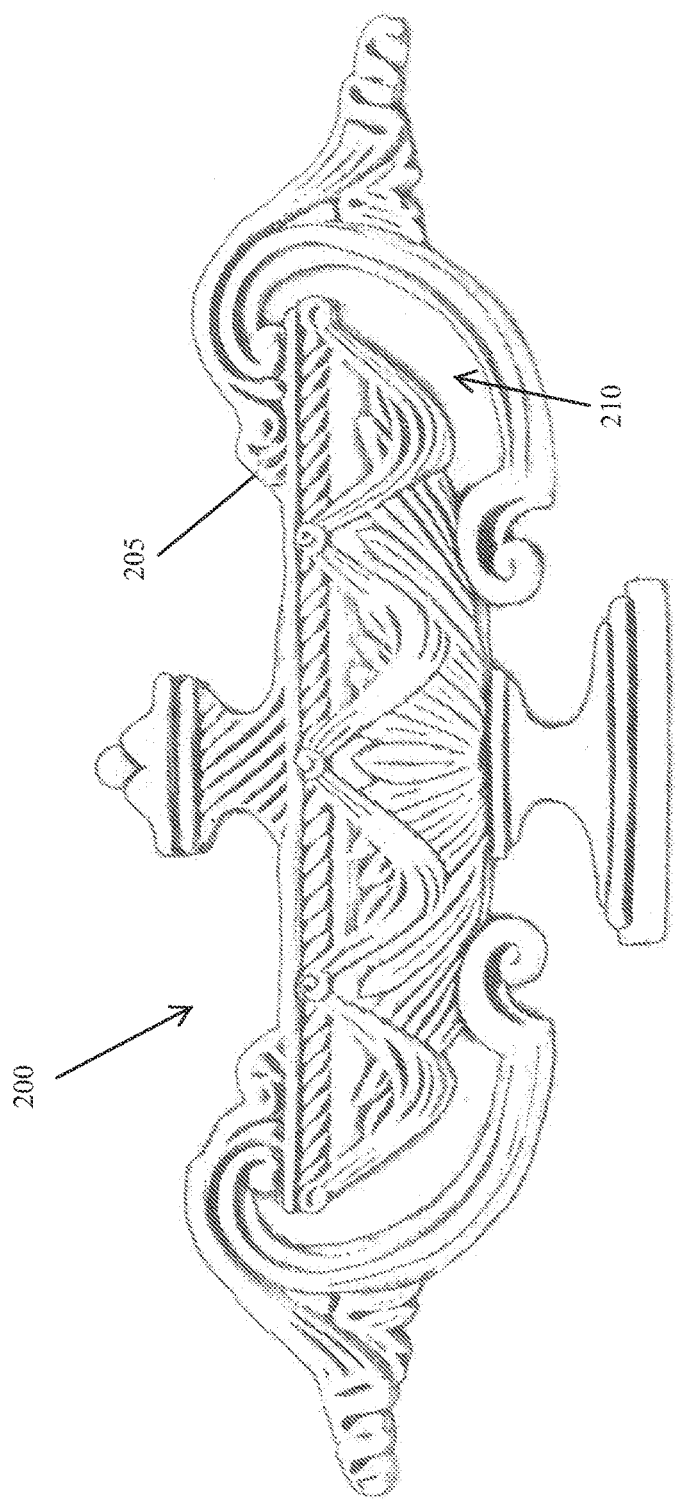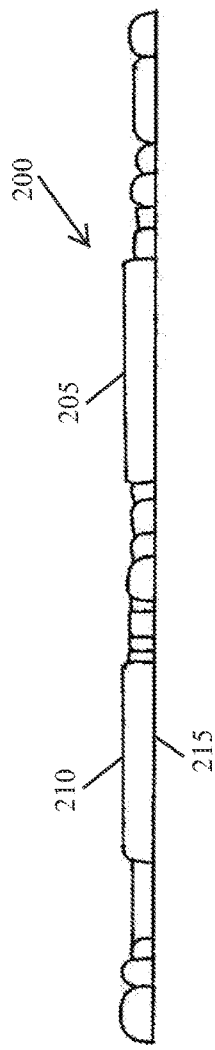
FIG. 2A
FIG. 2B

WALL APPLIQUÉ

CROSS REFERENCE TO RELATED APPLICATION

This application claims the benefit of U.S. Patent Application Ser. No. 61/985,027, which was filed on Apr. 28, 2014, and is incorporated herein by reference in its entirety.

TECHNICAL FIELD

This disclosure relates to implementations of a wall appliqué.

BACKGROUND

Old homes, castles, commercial buildings, and estate homes from the 1300's through the 1900's were frequently adorned with one or more architectural embellishments such as trim or moulding. Architectural moulding can include panel moulding, ceiling moulding, scrolls, rosettes, fleur-de-lis, urns, medallions and/or other suitable designs, shapes and symbols. Architectural moulding and embellishments were used alone, or in combination, to add an elegant look to an interior room and thereby elevate the appearance and value of the building. Traditional architectural moulding typically is made of wood, plaster, or stone. Accordingly, the manufacturing and installation of traditional architectural moulding can require relatively expensive machinery and skilled labor. Many homes built in the $20^{th}$ and $21^{st}$ century do not include architectural moulding or other embellishments because they are expensive and difficult to install.

U.S. Pat. No. 6,627,284 ("'284 patent") discloses a decorative wall and ceiling device having a base member comprised of a cross-linked polyethylene foam wherein an adhesive layer is located on the back side of the base member to attach the base member to a wall. The '284 teaches that the cross-linked polyethylene foam is for manufacturing large wall and ceiling devices, for example, a head board for a bed.

However, the decorative wall and ceiling device disclosed in the '284 patent has several disadvantages. First, the cross-linked polyethylene foam may not be suitable for cutting because a cut edge of the foam may expose its porous nature. Second, the decorative wall and ceiling device may not be suitable for cutting with a pair of scissors due to the thickness and/or rigidity of the cross-linked polyethylene foam material. Third, the cross-linked polyethylene foam material has limited flexibility and may not be suitable for use on curved surfaces or to form curved structures after its initial manufacture.

BRIEF DESCRIPTION OF THE DRAWINGS

FIGS. 2A-2B illustrate a second example wall appliqué according to the present disclosure.

DETAILED DESCRIPTION

Implementations of a wall appliqué are provided. In some implementations, a wall appliqué may be used to decorate and/or accent a wall or other suitable surface of a building. In some implementations, a wall appliqué may be used in lieu of traditional shoe moulding, panel moulding, ceiling moulding, door moulding, stair brackets, chair rails, and/or window moulding. In some implementations, the wall appliqué may be applied to a wall or other suitable surface with an adhesive.

In some implementations, the wall appliqué comprises a body portion having a front side and a back side. In some implementations, the body portion may have a decorative shape. In some implementations, the front side may have a three-dimensional relief thereon. In some implementations, the wall appliqué may be manufactured from a flexible, polyurethane material. In this way, the wall appliqué may be applied to both flat and irregular surfaces.

To use a wall appliqué having an adhesive pre-applied to the backside thereof, the protective covering may be removed from the backside of the body portion. The back side of the wall appliqué may then be positioned on a wall or other suitable surface to which the user desires to apply the wall appliqué. The wall appliqué may then be pressed against the wall or other suitable surface so that the adhesive located on the backside of the wall appliqué may adhere thereto.

In some implementations, the wall appliqué may be cut to a desired length. In this way, the user may fit the wall appliqué into a desired space or construct a structure of specific dimension.

Figure 1A:
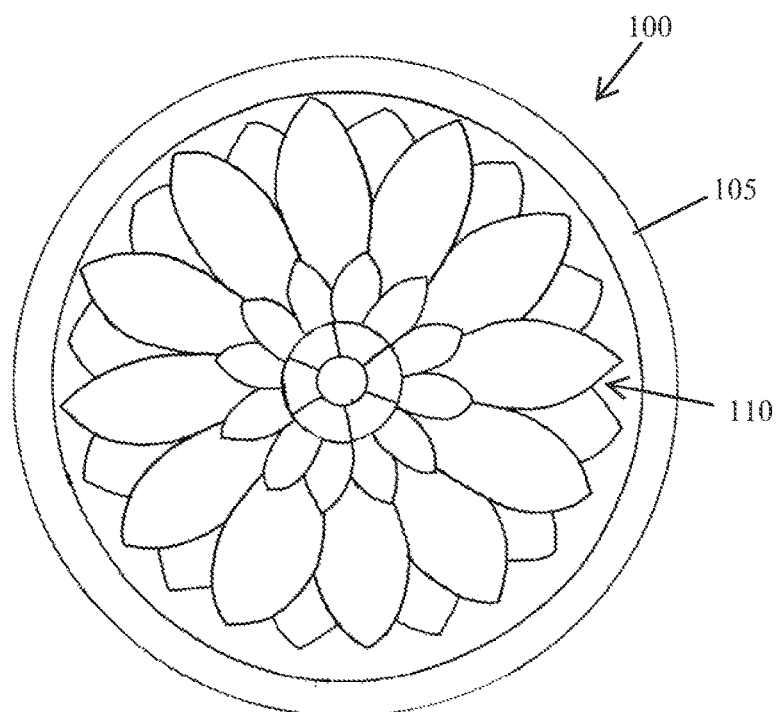
FIGS. 1A-1C illustrate a first example wall appliqué according to the present disclosure.
Figure 1B:
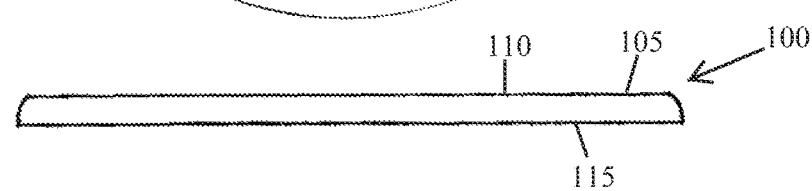
Figure 1C:
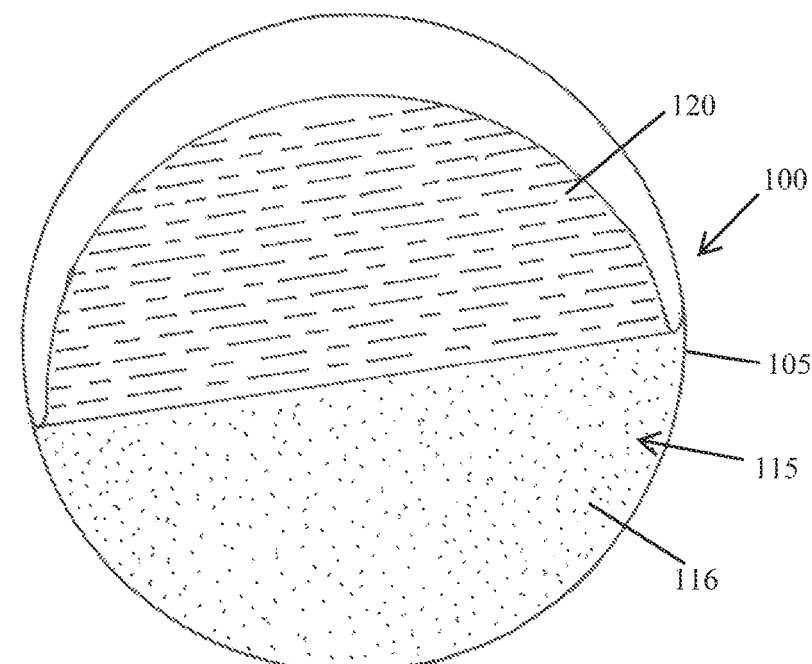

FIGS. 1A-1C illustrate an implementation of an example wall appliqué 100 according to the present disclosure. In some implementations, the wall appliqué 100 may be used to decorate and/or accent a wall or other suitable surface of a building. In some implementations, a wall appliqué may be used in lieu of traditional shoe moulding, panel moulding, ceiling moulding, door moulding, stair brackets, chair rails, and/or window moulding. In some implementations, the wall appliqué may be applied to a wall or other suitable surface (e.g., furniture) with an adhesive. In this way, the installation of the wall appliqué does not require tools and/or skilled labor to install. In some implementations, the wall appliqué may be used in various craft activities. In this way, the wall appliqué may be used to accent and/or decorate a creative project.

In some implementations, the wall appliqué 100 comprises a body portion 105 having a front side 110 and a back side 115.

In some implementations, the front side may have a three-dimensional surface thereon. In some implementations, the front side may have a relief thereon. In some implementations, the front side of the body portion may have a design thereon. In some implementations, the front side may have a three-dimensional design thereon. For example, as shown in FIG. 1A, the front side 110 has a rosette thereon (see, e.g., FIG. 1A). In some implementations, the front side may have a two-dimensional design thereon. In some implementations, the front side may have any shape, symbol, pattern, and/or design thereon. In some implementations, the front side of a wall appliqué may have no shape, symbol, pattern, and/or design thereon.

In some implementations, the body portion 105 of a wall appliqué 100 may be circular (see, e.g., FIG. 1A). In some implementations, the body portion may have a rectangular shape. In some implementations, the body portion may have any shape. In some implementations, the body portion may be constructed to have the same or similar shape as any shoe moulding, panel moulding, ceiling moulding, door moulding, stair brackets, chair rails and/or window moulding presently known or developed in the future.

In some implementations, the back side 115 of the body portion may be flat. In some implementations, the back side of the body portion may be curved. In some implementations, the back side may be any suitable shape or texture that facilitates the wall appliqué being attached to a suitable surface.

In some implementations, the back side 115 of the body portion 105 may have an adhesive 116 applied thereto. In this way, the wall appliqué may be applied to a suitable surface, without the use of tools, by simply pressing it into place. In some implementations, a wall appliqué 100 having an adhesive 116 on the back side 115 may have a protective cover 120 thereon for storage prior to use (see, e.g., FIG. 1C). In some implementations, the back side of a wall appliqué may not have an adhesive applied thereto. In this case, an adhesive may be applied to the backside of the wall appliqué by the end user prior to positioning the wall appliqué on the wall or other suitable surface to which the user desires to affix the wall appliqué. In some implementations, a laminated adhesive may be applied to the back side of the body portion. In some implementations a non-laminated adhesive may be applied to the back side of the body portion. In some implementations, a permanent adhesive may be used to attach the wall appliqué to a wall or other suitable surface. In some implementations, a semi-permanent adhesive may be used to attach the wall appliqué to a wall or other suitable surface. In this way, the user may be able to remove the wall appliqué at a later time.

In some implementations, a wall appliqué according to the present disclosure, may be manufactured from a synthetic, a semi-synthetic, a natural material, or a combination of such materials. In some implementations, the wall appliqué may be manufactured from an elastomer. In some implementations, the wall appliqué may be manufactured from any flexible material. In some implementations, the wall appliqué may be manufactured from polyurethane material. In this way, the edges of the wall appliqué will be smooth and nonporous when cut and/or the wall appliqué may be applied to curved and/or irregular surfaces. In some implementations, the wall appliqué may be manufactured from a material having a Shore (Durometer) hardness of 30 on a Shore A scale. In some implementations, the wall appliqué may be manufactured from a material having a Shore (Durometer) hardness of between 10 and 29, inclusive of 10 and 29, on a Shore A scale. In some implementations, the wall appliqué may be manufactured from a material having a Shore (Durometer) hardness of between 31 and 60, inclusive of 31 and 60, on a Shore A scale. In some implementations, the wall appliqué may be manufactured from a material having a Shore (Durometer) hardness such that the wall appliqué may be cut with a pair of handheld scissors. In some implementations, the wall appliqué may be manufactured from a material having a Shore (Durometer) hardness such that the wall appliqué is flexible enough to be applied to a curved surface. In some implementations, the wall appliqué may be manufactured from a material having a Shore (Durometer) hardness such that the wall appliqué may be cut with a pair of handheld scissors and flexible enough to be applied to a curved surface.

In some implementations, a wall appliqué according to the present disclosure may be ⅛" to ½" thick. In this way, the wall appliqué may be relatively easy to cut with a pair of common scissors. In some implementations, the wall appliqué may be thinner than ⅛" or thicker than ½".

In some implementations, a wall appliqué according to the present disclosure may be white. In this way, the wall appliqué may be painted any suitable color or combination of colors by the end user, if so desired. In some implementation, the wall appliqué may be any suitable color or combination of colors.

FIGS. 2A-2B illustrate another implementation of an example wall appliqué 200 according to the present disclosure. In some implementation, the wall appliqué 200 comprises a body portion 205, having a front side 210 and a back side 215. In some implementations, the wall appliqué 200 is similar to wall appliqué 100 but having a different front side and body shape.

Figure 5:
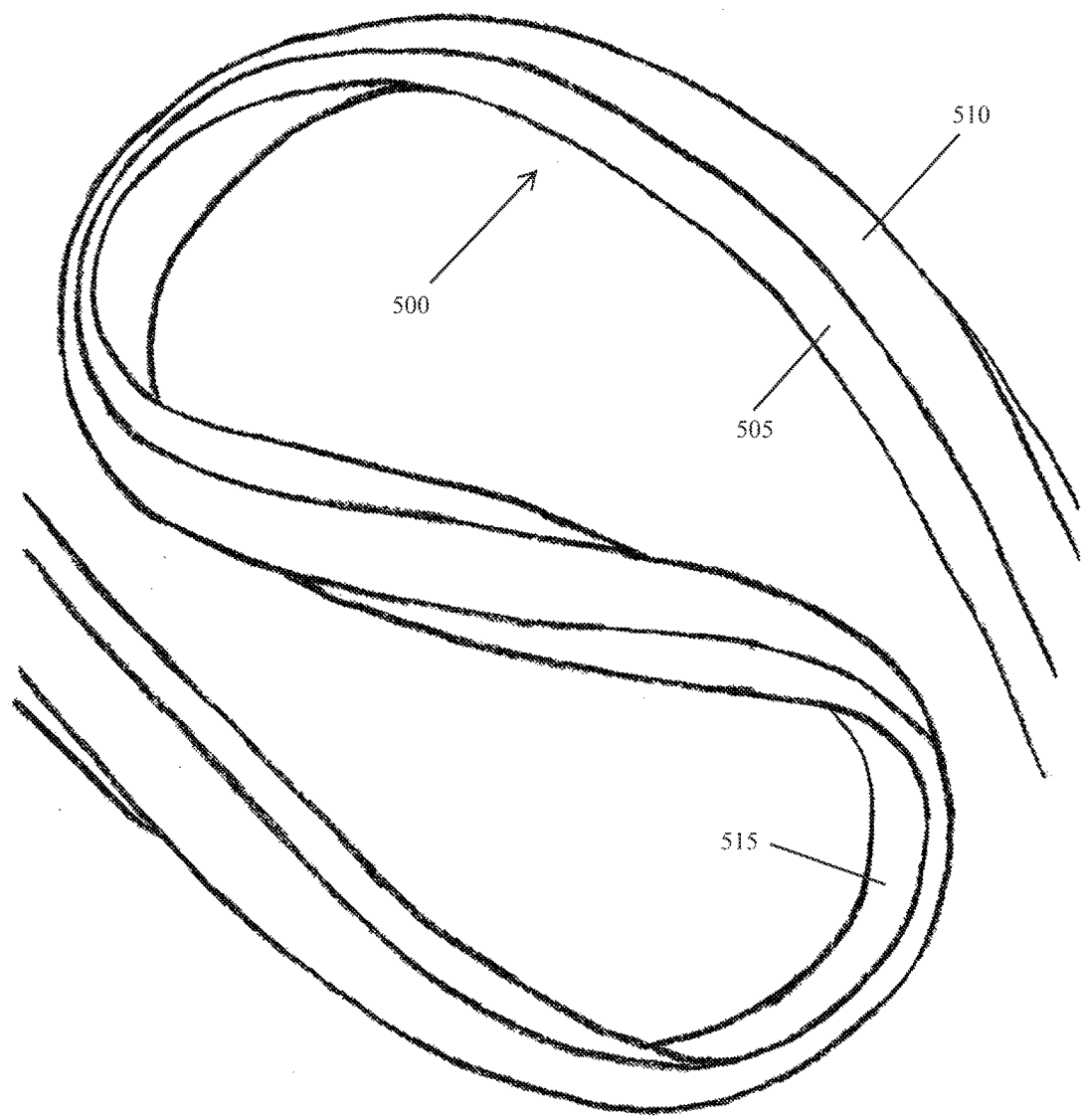
FIG. 5 illustrates a fifth example wall appliqué according to the present disclosure.

FIG. 5 illustrates another implementation of an example wall appliqué 500 according to the present disclosure. In some implementations, the wall appliqué 500 comprises a body portion 505 having a front side 510 and a backside 515. The wall appliqué 500 is similar to wall appliqué 100 but having a different front side and body shape. More particularly, in some implementations, the wall appliqué 500 may have a long, rectangular shape similar to conventional wood trim.

Figure 3A:
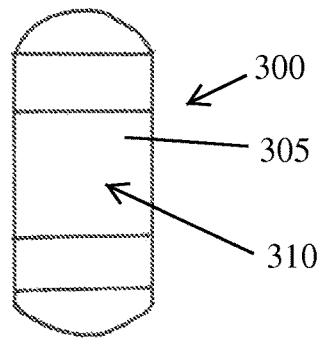
FIGS. 3A-3B illustrate a third example wall appliqué according to the present disclosure.
Figure 3B:
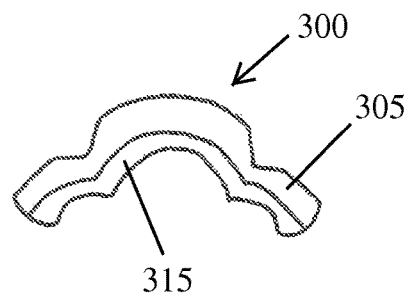

FIGS. 3A-3B illustrates another implementation of an example wall appliqué 300 according to the present disclosure. As shown in FIGS. 3A-3B, in some implementations, the wall appliqué 300 comprises a body portion 305 having a front side 310 and a back side 315. The wall appliqué 300 may include many of the features of wall appliqué 100 including the material of which it is made. As shown in FIG. 6B, in some implementations, the wall appliqué 300 may be configured to cover a seam which may exist between two pieces of abutting wall applique (e.g., wall appliqué 500).

In some implementations, a wall appliqué 300 may be used to decorate and/or accent a piece of trim, a wall, and/or other suitable surface of a structure. In some implementations, the wall appliqué 300 may be applied to a wall or other suitable surface with an adhesive. In this way, the installation of the wall appliqué does not require tools and/or skilled labor to install.

In some implementations, the body portion 305 of the wall appliqué 300 may have one or more rounded surfaces. In some implementations, the body portion of a wall appliqué may have no rounded surfaces.

In some implementations, the back side 315 of a wall appliqué 300 may be contoured to fit over a front side of a wall appliqué 500 or other trim. In some implementations, the back side of a wall appliqué 300 may be any suitable shape or texture that facilitates the wall appliqué 300 being attached to a suitable surface. In some implementations, the wall appliqué 300 may be any suitable shape that facilitates attachment to a piece of moulding and/or trim.

Figure 4A:
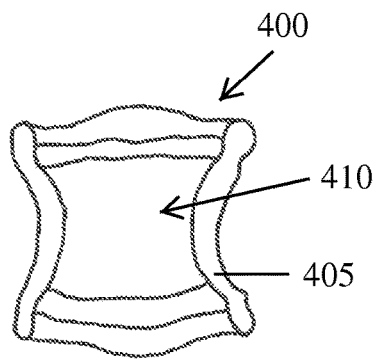
FIGS. 4A-4B illustrate a fourth example wall appliqué according to the present disclosure.
Figure 4B:
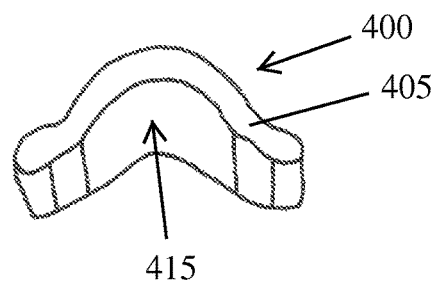

FIGS. 4A-4B illustrate another example implementation of a wall appliqué 400 according to the present disclosure. In some implementation, the wall appliqué 400 comprises a body portion 405 having a front side 410 and a back side 415. In some implementations, the wall appliqué 400 is similar to wall appliqué 300 but may be configured to cover a seam and/or gap which may exist between two pieces of wall appliqué (e.g., wall appliqué 500) meeting at an angle (e.g., the inside corner where two walls meet). In some implementations, the wall appliqué 400 illustrated in FIG. 4A may include many of the features of the wall appliqué 100 illustrated in FIG. 1A including the material of which it is made.

Figure 6A:
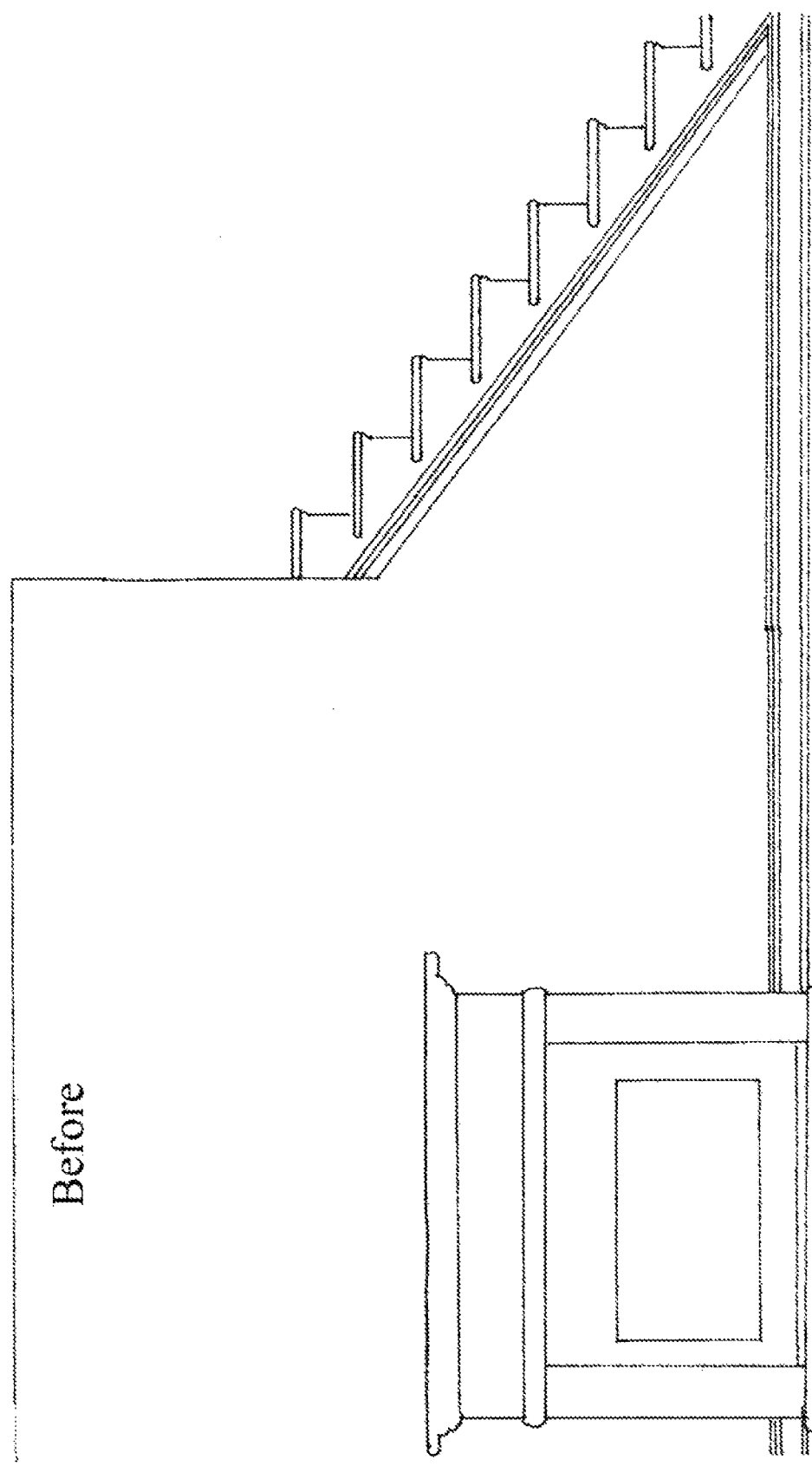
FIG. 6A illustrates a perspective view of a room.
Figure 6B:
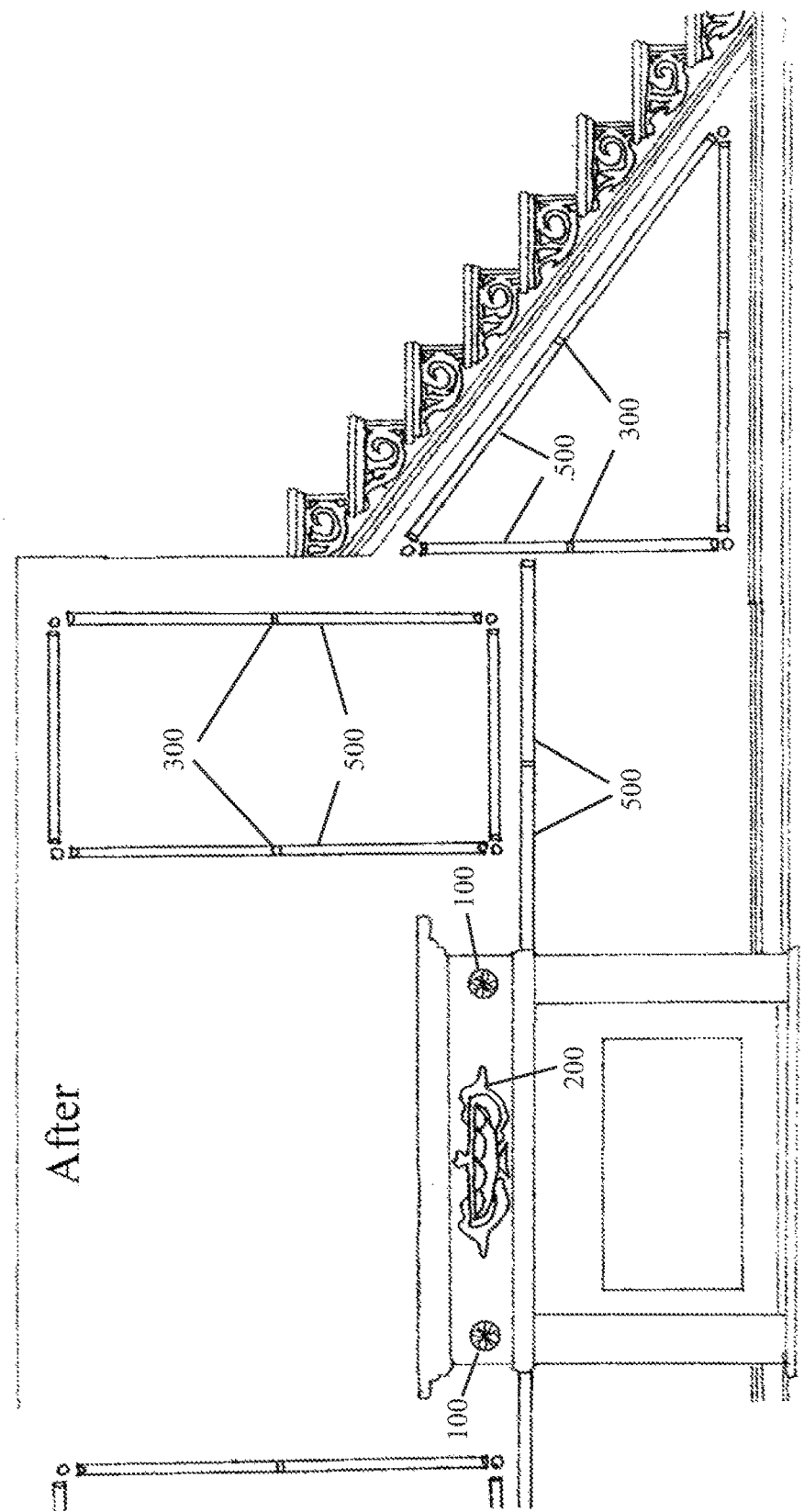
FIG. 6B illustrates a perspective view of the room shown in FIG. 6A having a plurality of wall appliqués constructed according to the present disclosure selectively attached to its walls and other suitable surfaces.

As shown in FIGS. 6A and 6B, one or more wall appliqués constructed according to the present disclosure may be used to decorate a wall or other suitable surface.

To use a wall appliqué according to the present disclosure having an adhesive pre-applied to the backside, thereof, the protective covering may be initially removed from the backside of the body portion. The back side of the wall appliqué may then be positioned and pressed on a wall or other suitable surface so that the adhesive located on the backside may adhere thereto. For example, the wall appliqué may be positioned and pressed on a mantel located above a fire place (see, e.g. FIG. 6B) or any other wall or surface as shown in FIG. 6B.

To use a wall appliqué according to the present disclosure that does not have an adhesive pre-applied to the backside, thereof, an adhesive may be initially applied to the backside of the body portion. The back side of the wall appliqué may then be positioned and pressed on a wall or other suitable surface so that the adhesive located on the backside may adhere thereto. For example, the wall appliqué may be positioned and pressed on a mantel located above a fire place (see, e.g. FIG. 6B) or any other wall or surface as shown in FIG. 6B.

In some implementations, the wall appliqué (e.g., wall appliqué 500) may be cut to a desired length. In this way, the user may fit the wall appliqué into a desired space or construct a structure of specific dimension (see, e.g., FIG. 6B).

In some implementation, the wall appliqué (e.g., wall appliqué 300) may be positioned over a seam which may exist between two pieces of abutting wall appliqué (e.g., wall appliqué 500) prior to being pressed against the two abutting pieces wall appliqué 300 (see, e.g., FIG. 6B).

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

The invention claimed is:

1. A wall appliqué consisting of:
   a body portion consisting of a single layer having a front side and a back side wherein the body portion is a polyurethane material and sized and shaped to be used as architectural embellishment for a wall wherein the body portion has a thickness that is greater than .033 inches and less than ⅛" and has a Shore hardness of 10-60 and wherein the body portion is configured to be cut with handheld scissors; and
   an adhesive layer directly on the back side of the single-layer body portion wherein the adhesive layer is configured to bond the body portion to a wall by applying pressure to the body portion when the body portion is positioned on a wall.

2. The wall appliqué of claim 1 wherein the front side has a pattern thereon.

3. The wall appliqué of claim 1 wherein the front side has a three-dimensional surface thereon.

4. The wall appliqué of claim 1 wherein the front side has a relief thereon.

5. The wall appliqué of claim 1 wherein the body portion is attached to a wall and is sized and shaped to be used as a shoe moulding, panel moulding, ceiling moulding, door moulding, stair brackets, chair rails, or window moulding.

6. The wall appliqué of claim 1 wherein the body portion is comprised of an elastomer and is attached to a wall.

7. The wall appliqué of claim 1 wherein the adhesive layer is a permanent adhesive.

8. The wall appliqué of claim 1 wherein the back side of the body portion is flat and is attached to a wall.

9. The wall appliqué of claim 1 wherein the back side of the body portion is curved and is attached to a wall.

10. The wall appliqué of claim 7 further comprising consisting of a protective cover configured to removably cover the adhesive layer located on the back side of the body portion.

11. The wall appliqué of claim 1 wherein the body portion is round.

12. The wall appliqué of claim 1 wherein the body portion is rectangular.

13. The wall appliqué of claim 2 wherein the pattern is a rosette.

14. A method of applying a first wall appliqué according to claim 7, the method comprising:
    positioning the first wall appliqué over a suitable surface;
    placing the back side of the first wall appliqué against the suitable surface; and
    applying pressure to the first wall appliqué so that the adhesive layer on the back side adheres to the suitable surface.

15. The method of claim 14 wherein positioning the first wall appliqué over a suitable surface comprising positioning the wall appliqué over a seam between a second wall appliqué according to claim 9 and a third wall appliqué according to claim 7.

16. A wall appliqué consisting of:
    a body portion consisting of a single layer having a front side and a back side wherein the body portion is a polyurethane material and sized and shaped to be used as architectural embellishment for a wall wherein the body portion has a thickness that is greater than .033 inches and less than ⅛" and has a Shore hardness of 10-60, wherein the body portion is configured to be cut with handheld scissors, and wherein the body portion is attached to a wall and;
    an adhesive layer directly on the back side of the single-layer body portion.

17. The wall appliqué of claim 16 wherein the body portion has a Shore hardness of 30.

18. A wall appliqué comprising:
a body portion consisting of a single layer having a front side and a back side wherein the body portion is a polyurethane material that is not a cross-linked polyethylene foam and sized and shaped to be used as architectural embellishment for a wall wherein the body portion has a thickness that is greater than .033 inches and less than ⅛" and has a Shore hardness of 10-60 and wherein the body portion is configured to be cut with handheld scissors; and
an adhesive portion comprising an adhesive layer wherein the adhesive portion is directly on the back side of the single-layer body portion wherein the adhesive layer is configured to bond the body portion to a wall by applying pressure to the body portion when the body portion is positioned on a wall wherein the adhesive portion is co-extensive with the back side of the body portion.

* * * * *